UNITED STATES PATENT OFFICE.

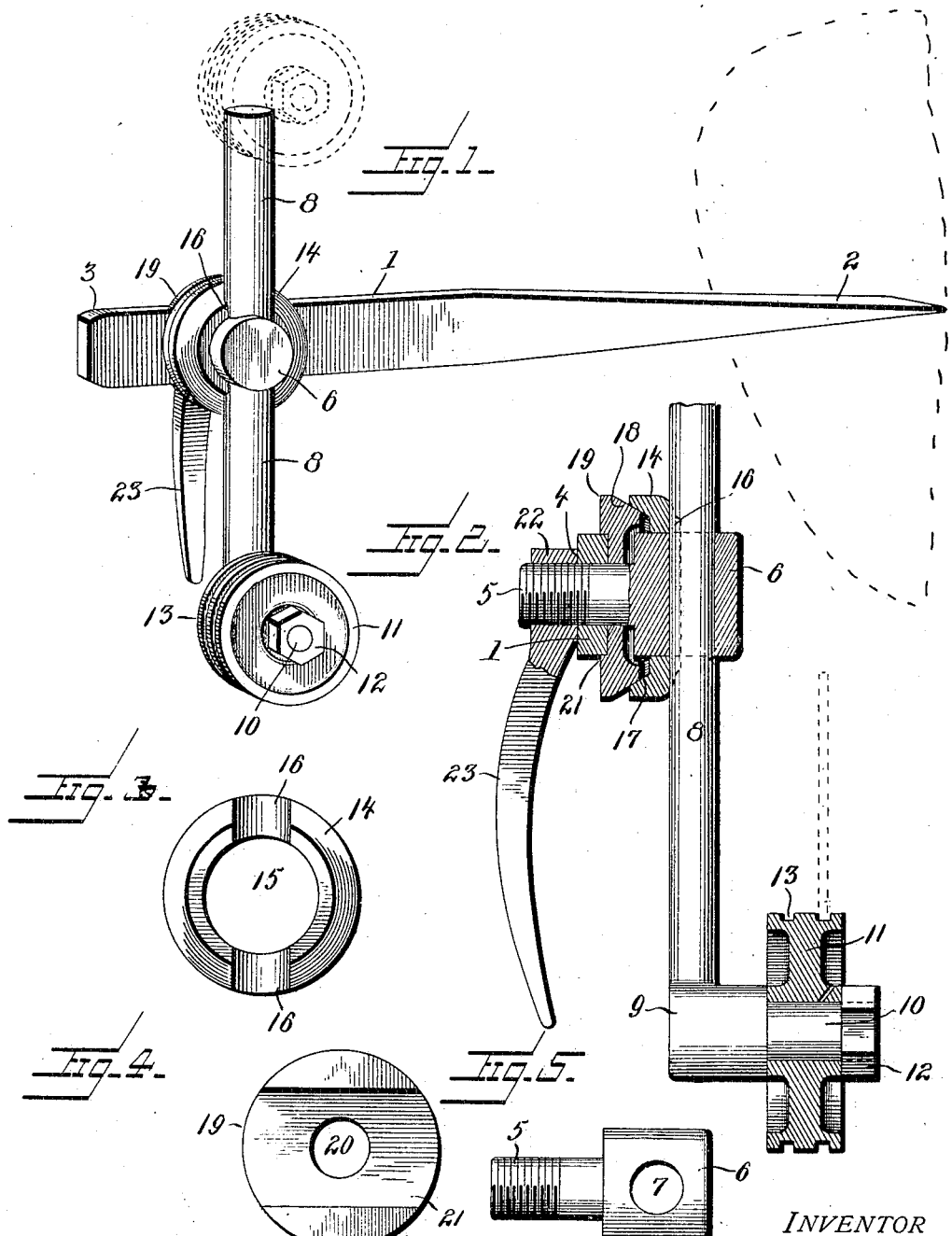

FRANK H. LAMB, OF HOQUIAM, WASHINGTON.

UNDERCUTTER-SUPPORT.

No. 830,238.  Specification of Letters Patent.  Patented Sept. 4, 1906.

Application filed December 23, 1905. Serial No. 293,136.

*To all whom it may concern:*

Be it known that I, FRANK H. LAMB, a citizen of the United States, residing at Hoquiam, in the county of Chehalis, State of Washington, have invented certain new and useful Improvements in Undercutter-Supports, of which the following is a specification, reference being had therein to the accompanying drawings.

This invention relates to an undercutter-support for saws, and particularly to an improved construction and arrangement of the supporting-arm and means for adjustably clamping the same upon the holding-dog.

The invention has for an object to provide an improved construction of clamp by which the supporting-arm carrying the bearing-wheel for the saw is adjustably mounted upon a dog and may also be reversed in position, so as to bring said wheel above the horizontal plane of said dog and permit a continued sawing action.

Other and further objects and advantages of the invention will be hereinafter set forth, and the novel features thereof defined by the appended claims.

In the drawings, Figure 1 is a perspective of the invention applied in position for use; Fig. 2, a vertical section thereof; Fig. 3, a detail elevation of one of the friction-washers; Fig. 4, a similar view of the coöperating washer, and Fig. 5 a plan of the holding-nut.

Like numerals of reference indicate like parts throughout the several views of the drawings.

The numeral 1 designates a dog, which may be of any desired construction or configuration and provided at its inner end with a sharpened portion 2 for insertion into the log or other object to be sawed from the under side. The outer end 3 of this dog is provided with an aperture 4, through which the threaded shank 5 of the eyebolt 6 is adapted to pass. This bolt is provided with an aperture 7 in the body thereof, through which the circular supporting-arm 8 for the saw passes to permit a lateral adjustment therein. This supporting-arm is provided at its lower portion with a lug 9, provided with a journal 10 at its outer end to receive the saw-wheel 11, which is held in position thereon by the clamping-nut 12. This wheel is provided upon its periphery with one or more grooves 13, in which the back of the saw is adapted to rest, as shown by dotted lines in Fig. 2, so that the teeth thereof are uppermost and adapted to engage the under edge of a log or timber as the wheel is adjusted relative thereto.

The vertical adjustment of the arm 8 upon the dog is effected by means of the bolt 6 and the friction-washer 14, having a central aperture 15 adapted to fit over the body of the bolt, as shown in Fig. 2, and with the recessed face 15, provided with curved walls to receive the supporting-arm 8 and by frictional engagement therewith clamp it in adjusted position. The opposite face of the washer 14 is provided with a beveled recess 17, Fig. 2, into which the beveled edge 18 of the clamping-washer 19 is adapted to fit. This washer-as shown in Fig. 4, is provided with a central aperture 20, adapted to fit over the shank of the bolt and with an angular recess or seat 21 extending across the outer face thereof, in which the edges of the dog 1 lie, so as to support the members against any rotary movement relative to the dog and yet permit the horizontal adjustment thereof. For the purpose of clamping these washers and the several parts controlled thereby into firm contact for retaining the saw-supporting wheel in adjusted position a nut 22 is threaded upon the shank 5 of the supporting-bolt 6 and provided with an operating-handle 23, by which it may be conveniently rotated.

This invention is particularly adapted for use by sawyers in lumbering in the woods for supporting the saw while making a cut upon the under side of a log with the toothed edge of the saw uppermost, and therefore provides a simple, light, and efficient device for supporting the back of the saw and permitting an upward feed thereof during the progress of the saw through the log. This adjustment upward is made with the parts in the position shown by full lines in Fig. 1 until the wheel reaches its uppermost adjustment below the holding-bolt, and the arm is then reversed in position, so as to bring the wheel above the dog, and a continued upward adjustment is permitted, as shown in Fig. 1, thus avoiding the necessity of removing the dog from position and permitting a continuous sawing through the log. It will also be noted that in addition to the vertical adjustment of the saw-supporting arm a lateral adjustment of this arm upon the dog is permitted by means of the frictional clamping means hereinbefore shown and described.

Having now described the invention and set forth its merits, what is claimed, and desired to be secured by Letters Patent, is—

1. An undercutter-support comprising a dog adapted for insertion in the material to be sawed, a supporting-arm provided with a saw bearing thereon at one end, and means for mounting said arm upon said dog to permit the reversal of the arm to bring the saw-bearing either above or below the dog.

2. An undercutter-support comprising a dog adapted for insertion in the material to be sawed, a supporting-arm provided at one end with a saw-bearing, and means for mounting said arm upon said dog to permit the adjustment and reversal of the arm and bearing relative to the dog.

3. An undercutter-support comprising a dog adapted for insertion in the material to be sawed, a supporting-arm provided at one end with a saw-bearing, and clamping means for supporting said arm at one side of said dog to permit its reversal and adjustment without interference with the dog.

4. An undercutter-support comprising a dog, a supporting-arm mounted thereon for vertical adjustment and provided at one end with a saw-bearing, a supporting-bolt through which said arm passes, and a clamping-washer mounted upon said bolt and provided with a recessed face to engage one side of said arm.

5. An undercutter-support comprising a dog, a supporting-arm mounted thereon for vertical adjustment and provided at one end with a saw-bearing, a supporting-bolt through which said arm passes, a clamping-washer mounted upon said bolt and provided with a recessed face to engage one side of said arm, an extended threaded shank from said bolt, a coöperating washer mounted upon said shank to engage the clamping-washer and provided upon one face with a recess to seat upon said dog, and a holding-nut mounted upon the shank of the supporting-bolt at the opposite side of the dog from said washers.

6. In a undercutter-support, a dog having an aperture at its outer end, a supporting-bolt having a threaded shank extending through said aperture, a supporting-arm adjustably carried by said bolt, means for clamping said arm and bolt to said dog, and a supporting-roller disposed upon a laterally-extending lug at one end of said arm.

7. In an undercutter-support, a supporting member, an arm carried thereby and provided with a saw-bearing, a clamping-bolt through which said arm passes, a clamping-washer mounted upon said bolt and provided upon one face with a recess to receive a portion of said arm and upon its opposite face with a beveled clamping-seat, a coöperating washer having a beveled face to enter said seat, and means for clamping said washers together.

8. In an undercutter-support, a supporting member, an arm carried thereby and provided with a saw-bearing, a clamping-bolt through which said arm passes, a clamping-washer mounted upon said bolt and provided upon one face with a recess to receive a portion of said arm and upon its opposite face with a beveled clamping-seat, a coöperating washer having a beveled face to enter said seat, a holding-dog seated upon the outer face of the coöperating washer, and a clamping-bolt threaded upon the shank of the holding-nut.

In testimony whereof I affix my signature in presence of two witnesses.

FRANK H. LAMB.

Witnesses:
R. E. DAWBY,
L. B. CARTER.